United States Patent Office 3,047,482
Patented July 31, 1962

3,047,482
PRODUCTION OF OXIMES
Chao-shing Cheng and Bernard Taub, Williamsville, N.Y., assignors to Allied Chemical Corporation, New York, N.Y., a corporation of New York
No Drawing. Filed July 31, 1959, Ser. No. 830,743
23 Claims. (Cl. 204—162)

This invention relates to improvements in a process for the production of saturated aliphatic (including cycloaliphatic) oximes. More particularly, it relates to improvements in the process of preparing saturated aliphatic oximes by reaction of a saturated aliphatic compound with a nitrosating agent, under the influence of actinic light. Especially, our invention is concerned with improvements in the process of obtaining cyclohexanone oxime from cyclohexane and a nitrosyl halide, particularly nitrosyl chloride, under the influence of actinic light.

Cyclohexanone oxime is commercially important for conversion, by Beckmann rearrangement, to caprolactam which in turn can be polymerized to nylon 6. Open chain oximes such as methyl ethyl ketoxime, butyraldoxime, etc. are used commercially as anti-skinning agents in paints.

It has been proposed to prepare oxime hydrochlorides of cyclic ketones, such as cyclohexanone oxime hydrochlorides, by reaction of cyclohexane with nitrosyl chloride under the influence of actinic light, especially ultraviolet light. The production rates and/or yields according to prior art proposals are relatively low, such as about 10 grams or less per liter of cyclohexane solution per hour and/or about 40% of theory or lower conversion of cyclohexane to cyclohexanone oxime based on the quantity of nitrosyl chloride supplied. To conserve nitrosyl chloride, it is the general practice to maintain conditions of temperature and feed of nitrosyl chloride at which substantially all of the nitrosyl chloride supplied is consumed before escaping from the reaction mixture, which can be in one vessel or in a series of vessels.

In accordance with the present invention, we have found that the rate of conversion by nitrosating agents of saturated aliphatic compounds to oximes under the influence of actinic light generally as above outlined can be enhanced and yields improved by providing throughout the reaction mixture a photosensitive carbonyl compound, such as an aldehyde, or open chain ketone, or carboxylic acid ester, or peroxycarboxylic acid, or ester of peroxycarboxylic acid; or a compound which may be called a carbonyl compound precursor, i.e. an organic compound which is sensitive to light and can be transformed into a carbonyl compound in the presence of a nitrosating agent and light. Specific examples are alkanols, alkyl nitrites, organic hydroperoxides, and aliphatic iodides. The corresponding aromatic compounds, such as quinones, phenols and aryl iodides are also operative. Thus catalysts which are employed in our process are quinones; phenols; aryl iodides; aldehydes; open chain alcohols (i.e. alcohols having at least one hydroxyl group attached to a carbon atom other than an atom of a ring); nitrous esters of said alcohols (i.e. alkyl nitrites); esters of carboxylic acids; open chain ketones (i.e. ketones having at least one oxo carbon atom which is not a member of an alicyclic ring); peroxycarboxylic acids and esters thereof; carboxylic acid peroxides; organic hydroperoxides; and aliphatic iodides.

Preferably the reaction is carried out in the presence of free hydrogen chloride or hydrogen bromide; and in presence of an inert solvent for reaction byproducts, suitably benzene.

As a further feature of our invention we have discovered that chlorine, bromine, and particularly iodine, when present in the reaction mixture together with the carbonyl compound or carbonyl compound precursor or other catalyst of our invention, can further improve production rates and yields of the desired oximes.

We believe that the catalytic effect which characterizes the present invention is due to the participation of free radicals in the course of the nitrosation reaction here involved. The required dissociation of the nitrosating agent, we believe, is aided by free radicals. More specifically, we would note that under the influence of ultraviolet light acetone is known to decompose with the formation of ethane, indicating a free radical mechanism, which can be shown by the following equations, wherein an asterisk designates a free radical:

(a) $CH_3COCH_3 \xrightarrow{light} CH_3CO^* + CH_3^*$ (b) $CH_3CO^* \xrightarrow{light} CH_3^* + CO$ (c) $CH_3^* + CH_3^* \longrightarrow CH_3CH_3$ Aldehydes are believed to decompose into free radicals under the influence of light in a similar fashion:

$$R\overset{O}{\underset{\|}{C}}-H \xrightarrow{light} R^* + H^* + CO$$

$$R^* + H^* \longrightarrow RH$$

Alcohols are known to react with nitrosyl chloride to form nitrites; and nitrites in turn decompose, e.g. under the influence of light, to give carbonyl compounds as discussed for example in Sidgwick's "Organic Chemistry of Nitrogen" Taylor and Baker Edition of 1937, page 2:

$$RCH_2OH + NOCl \longrightarrow RCH_2ONO + HCl$$

$$2RCH_2ONO \longrightarrow R\overset{O}{\underset{\|}{C}}-H + RCH_2OH + 2NO$$

Moreover, the reaction between nitrosyl chloride and cyclohexane can be regarded as a free radical reaction according to the following equations in which

symbolizes the cyclohexane molecule and

symbolizes a cyclohexyl free radical.

(a) 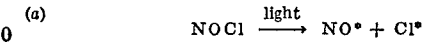

(b) 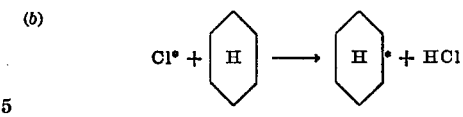

(c) 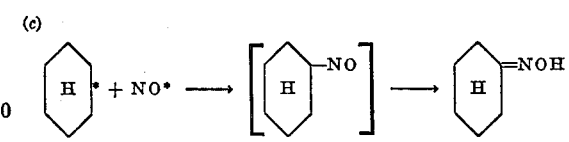

A process in accordance with our invention can suitably be conducted as follows:

A solution of a saturated aliphatic compound, such as cyclohexane, preferably in a liquid which is a solvent for reaction byproducts and which is non-reactive under the conditions of the process, such as benzene, is placed in a reaction vessel equipped with an agitator, an immersion type source of actinic light, and an inlet tube for introducing the nitrosating agent, e.g. nitrosyl chloride. The catalyst is added and the mixture is preferably cooled to below ambient temperature, e.g. to 10° C. to 15° C. The light source is turned on, the reaction mixture is saturated with hydrogen halide, e.g. hydrogen chloride, and the nitrosating agent, e.g. nitrosyl chloride, is fed into the agitated illuminated reaction mixture.

The reaction between a nitrosyl halide and an aliphatic compound typically results in the formation of a ketoxime monohydrohalide, e.g. cyclohexanone oxime monohydrochloride, a solid product. When the reaction takes place in the presence of free hydrogen halide typically a "dihydrohalide" is formed as an oily product insoluble in the reaction mixture. The term "dihydrohalide" is used herein to denote a compound of an oxime and a hydrogen halide containing more than one mol of hydrogen halide per mol of oxime. The exact ratio is variable; the product is most likely an oily mixture of mono- and dihydrohalides.

The oily liquid oxime dihydrohalide product settles rapidly to the bottom of the reaction chamber and can be drawn off. Thus by provision of free hydrogen halide, e.g. hydrogen chloride in the reaction mixture, separation of the product from the reaction mixture is facilitated. The mol ratio of free hydrogen halide which can be employed:nitrosyl halide used is suitably from 1:1 to 5:1, preferably being sufficient to keep the reaction mixture saturated with hydrogen halide.

It is known that oxime and oxime hydrohalides of aliphatic ketones, such as cyclohexanone oxime and hydrochlorides and hydrobromides of cyclohexanone oxime, dissolve in acids such as formic, sulfuric, etc. to form a phase which separates from the hydrocarbon phase. Accordingly it is possible to provide such acids in the reaction zone during our nitrosation of hydrocarbons, instead of or in addition to hydrohalide, and thus form a separate acid phase containing our nitrosation product.

The provision of a strong, concentrated acid, at least as strong as ortho-phosphoric acid, with a boiling point when anhydrous of at least 40° C., and immiscible with saturated hydrocarbons, such as aqueous 70% and stronger sulfuric acid or oleum, the ordinary (85%) concentrated or stronger phosphoric acid, pyrophosphoric acid, polyphosphoric acid, etc. is a useful expedient in our process. Thereby, we have found, hydrogen halide combined with the oxime product is liberated and passes back into the reaction mixture where it again becomes available for continuing the conversion of the nitrosation product to an insoluble oxime dihydrohalide. It then becomes unnecessary to provide any supply of a hydrohalide, after the reaction mixture has once become saturated therewith.

Suitably an immiscible acid as above can be suspended in the reaction mixture and/or maintain as a relatively quiescent layer below the reaction mixture proper. Oxime dihydrohalides which are formed contact this acid, whereby hydrogen halide e.g. hydrogen chloride is generated from the oxime dihydrohalide and passes back into the reaction mixture proper and the oxime dissolves in the acid. The acid chosen can be one which is effective to promote the rearrangement of oxime, e.g. sulfuric acid, polyphosphoric acid, etc. so that the withdrawn solution of oxime in acid can thereafter be used directly in a rearrangement reaction. The preferred acid, for reasons of effectiveness and economy, is 70%–100% sulfuric acid, which can contain a dissolved acid anhydride, e.g. sulfur trioxide.

The separated phase containing oxime as salt of an acid or dissolved in acid can be neutralized, e.g. with caustic alkali to obtain free oxime; or it can be fed into a rearrangement reaction mixture as dihydrohalide or as solution in a suitable strong acid as above discussed. It will be readily appreciated that our process is adaptable to either batchwise or continuous production of a ketoxime or its rearrangement product.

Referring now to the more specific details of our improved nitrosation process, the following specific compounds will serve to illustrate the various groups of catalysts that can be employed in accordance with our invention.

*Alcohols and Phenols* methanol
ethanol
isopropanol
tertiary-butanol
1-pentanol
1-octanol
1-dodecanol
2-butanol
benzyl alcohol
phenol
α-naphthol The $C_1$–$C_4$ primary alkanols are a preferred subgroup of our catalysts in view of their availability, high activity, and ease of recovery during purification of reactant solution.

*Aldehydes* trioxane (a trimer of formaldehyde)
acetaldehyde
propionaldehyde
n-butyraldehyde
n-valeraldehyde
n-heptaldehyde
benzaldehyde
α-naphthaldehyde
crotonaldehyde
phenylacetaldehyde

*Ketones* acetone
methylethyl ketone
methyl amyl ketone
ethyl butyl ketone
diisopropyl ketone
acetophenone
benzophenone
p-benzoquinone
biacetyl The group consisting of aldehydes and open chain ketones is a preferred group of catalysts in view of their activity and availability.

*Nitrites* methyl nitrite
ethyl nitrite
n-propyl nitrite
n-hexyl nitrite
isopropyl nitrite
2-butyl nitrite

*Esters of Carboxylic Acids* ethyl acetate
isoamyl propionate

*Carboxylic Acid Peroxides* lauroyl peroxide
benzoyl peroxide

*Peroxycarboxylic Acids and Esters Thereof* peracetic acid
t-butyl perbenzoate

*Organic Hydroperoxides* cumene hydroperoxide
cyclohexanone hydroperoxide

*Aliphatic and Aryl Iodides* ethyl iodide
cyclohexyl iodide
iodobenzene

Substitution products of these catalysts can also be employed, e.g. halo, nitro, aryl, cyclo-alkyl, alkoxy, etc., derivatives.

The amount of catalyst used in our process can be varied over a wide range. Relatively small amounts in the order of 0.01% by weight based on the weight of the saturated aliphatic compound to be nitrostated have been found to give a noticeable improvement in the rate of conversion. In most instances the quantity employed will be small, not above say 10% by weight, based on the weight of saturated aliphatic compound employed. Usually at least about 0.1% of the catalyst, based on the weight of saturated aliphatic compound to be nitrosated, is employed; frequently a preferred amount of catalyst is in the order of 1%. Larger amounts than 10% of catalyst can be employed at least when using some of the catalysts but will not usually be selected, since the use of such large quantities is generally unnecessary and may be wasteful. Specifically when using an alkyl nitrite as catalyst, the amount used should be kept not above 10% by weight based on the weight of the reactant to be nitrosated, for the reason that alkyl nitrites react with hydrogen chloride to form nitrosyl chloride, whereby hydrogen chloride will be consumed and excessive concentrations of nitrosyl chloride, beyond the amounts which are substantially completely consumed in the reaction mixture, may be produced if the nitrite concentration is above 10% by weight.

As stated above, the presence of chlorine, bromine and/or iodine together with our catalyst in the reaction mixture generally improves the reaction rates and yields in our process. Iodine is preferred since chlorine and bromine, because of their volatility, tend to escape from the reaction mixture. The amount of halogen used is not critical and can be small; an amount of 20% by weight based on the weight of catalyst employed is generally adequate. Ordinarily, therefore, the weight of halogen employed will be of the same order of magnitude as the weight of carbonyl compound or other catalyst employed in our process.

Our process can be carried out at temperatures as low as −20° C. and up to at least 50° C. Preferably, we use temperatures between about 10° C. and about 25° C. At low temperatures, we have found, the rate of conversion tends progressively to decrease, whereas at high temperatures the formation of byproducts tends to become excessive.

Nitrosating agents suitable for use in our process are those which under the influence of actinic light provide a nitric oxide free radical (NO*) and a strongly electronegative radical capable of abstracting a hydrogen atom from the reactant to be nitrostated. Among suitable agents are the following compounds and mixtures thereof:

nitrosyl chloride
    nitrosyl bromide
    nitrosyl borofluoride
    nitrosyl sulfuric acid in the
      presence of hydrogen halide
    nitric oxide and chlorine mixtures Among saturated aliphatic compounds which can be converted to the corresponding oximes by our process are especially the normally liquid saturated cycloaliphatic and open chain aliphatic hydrocarbons of which the following are typical examples:

| | |
|---|---|
| cyclohexane | tetrahydronaphthalene |
| methylcyclohexane | decahydronaphthalene |
| cyclopentane | butane |
| methylcyclopentane | hexanes |
| dimethylcyclohexane | octanes |
| cycloheptane | dodecanes |
| methylcycloheptane | kerosene | hydrocarbons obtained by the Fischer-Tropsch synthesis

Substitution products of these hydrocarbons, containing inert substituents such as aryl, carbocyclo, heterocyclo, halo, nitro, alkoxy, etc. can also be converted to oximes by our process using the procedure of the examples below.

Our process, as above stated, is preferably carried out in the presence of an inert solvent for reaction byproducts, i.e. a solvent of byproducts in the reaction mixture which is itself non-reactive under the reaction conditions, and which does not solubilize the oxime hydrohalide reaction product in the reaction mixture. The prime function of this solvent is to prevent the adherence of reaction byproducts on solid surfaces in the reaction mixture, especially the surfaces of the lamps. An effective solvent of this type is benzene. Chlorobenzene, dichlorobenzene, nitrobenzene, carbon tetrachloride and the like can also be used. Others can readily be selected by routine testing. The amount of such solvent used can be varied within wide limits. We have found that amounts of solvent from about 1% to about 200% based on the weight of the aliphatic compound can be conveniently used, and especially a volume of solvent up to about ½ the volume of the liquid saturated hydrocarbon to be nitrostated gives a satisfactory reaction mixture.

Other materials previously recommended to reduce coating of surfaces in these reactors, e.g. the lower aliphatic acids as disclosed in U.S. Patent 2,719,116, can also be employed in our process instead of or in addition to a non-reactive solvent.

Actinic light is required in our process. Light sources including bright sunlight, arc lights, and ultraviolet lamps can be used. We prefer to use light such as that provided by an ultraviolet radiation source emitting radiation with the major proportion of its intensity at wavelengths between 200 and 600 millimicrons.

The following examples describe completely specific embodiments of our invention and illustrate our improved process including the best mode contemplated by us for carrying out our invention. Parts are by weight and temperatures are in degrees centigrade. The "conversions" and "yields" reported in each instance are based on the amount of nitrosating agent charged, substantially all of which was consumed in the reaction.

EXAMPLE 1

*Preparation of Cyclohexanone Oxime*

A mixture of 763 grams of cyclohexane, 369 grams of benzene, one gram of iodine and 5 grams of acetone was cooled to 10° to 15° C. in a jacket cooled cylindrical reaction vessel provided with an agitator to distribute the catalyst and added reactants throughout the reaction mixure, thermometer, gas inlet tube and immersion type mercury vapor lamp of 450 watts power as source of ultraviolet radiation. A mixture of nitrosyl chloride and hydrogen chloride was fed into the agitated illuminated mixture at the rate of 26 grams/hour and 28 grams/hour, respectively, while the temperature of the reaction mixture was maintained at 10° to 15° C.

After 3 hours, 193 grams of oily cyclohexanone oxime dihydrochloride, which collected at the bottom of the vessel, was drawn off and neutralized with 50% aqueous caustic soda. The neutralized mixture was extracted with ethyl ether from which extract 94 grams of cyclohexanone oxime, representing a conversion of 70% of theory (based on nitrosyl chloride supplied) was obtained.

EXAMPLE 2

The effect of the presence of the catalyst used in Example 1 above, and effects of certain reaction conditions, are shown in the comparative data presented in Tables I and II below. In the runs of Tables I and II, the procedure of Example 1 was followed with the exceptions noted in the tables.

TABLE I

| Run | Cyclohexane, ml. | Benzene, ml. | NOCl, g./hr. | HCl, g./hr. | Acetone, ml. | Iodine, g. | Reaction Temperature, °C. | Cyclohexanone Oxime | |
|---|---|---|---|---|---|---|---|---|---|
| | | | | | | | | Production Rate, g./hr. | Percent Conversion (theory based on NOCl supplied) |
| A | 1,000 | 500 | 26 | 28 | | | 10-15 | 14.7 | 33 |
| B | 1,500 | | 15 | 28 | | | 10-15 | 7.5 | 29 |
| C | 1,000 | 500 | 27 | 28 | | 1 | 10-15 | 18.9 | 39 |
| D | 1,000 | 500 | 26 | 28 | 5 | | 10-15 | 22.8 | 50 |
| E | 1,500 | | 28 | 28 | 5 | 1 | 10-15 | 15.8 | 34 |
| F | 1,000 | 500 | 26 | 28 | 5 | 1 | 10-15 | 31.2 | 70 |

As can be seen from data shown in Table I, the reaction between nitrosyl chloride and cyclohexane is only moderately affected by iodine alone (run C vs. run A) but is considerably improved in rate and yield upon adding acetone alone (run D) and markedly further improved by adding iodine as well as acetone (run F). The beneficial effect of a solvent in the catalyzed system is seen by comparing run F vs. run E, and run C vs. run B. Even at the low feed rate of NOCl used in run B, the byproduct formation was serious, coating the lamp and resulting in low rate of reaction and low yield of oxime.

The effect of temperature is indicated by the series of runs summarized in Table II. No catalyst was used in this series of runs.

The favorable effect of a low NOCl feed rate on oxime yield can be observed by comparing run A of Table II vs. run A of Table I.

TABLE II

| Run | Cyclohexane, ml. | Benzene, ml. | NOCl, g./hr. | HCl, g./hr. | Reaction Temperature, °C. | Cyclohexanone Oxime | |
|---|---|---|---|---|---|---|---|
| | | | | | | Production Rate, g./hr. | Percent Conversion (theory based on NOCl supplied) |
| A | 150 | 50 | 0.9 | 1.5 | 10-15 | 0.9 | 59 |
| B | 150 | 50 | 1.0 | 1.5 | 25 | 0.8 | 46 |
| C | 150 | 50 | 0.9 | 1.5 | 40 | 0.2 | 14 |
| D | 150 | 50 | 5.2 | 1.5 | -22 | 1.1 | 12 |

Note: At the temperature of Run D, NOCl was liquefied.

EXAMPLE 3

A mixture of 1200 grams of cyclohexane and 680 grams of benzene was reacted at 10° C.–15° C. with nitrosyl sulfuric acid-hydrogen chloride mixture in the presence, as well as in the absence of our catalyst. The nitrosyl sulfuric acid was prepared by the method described in Inorganic Synthesis, vol. I, page 55.

The procedure described in Example 1 was used except as follows. The light source in these experiments was a 500 watt tungsten filament projection lamp immersed in the reaction mixture, instead of a mercury vapor lamp. The catalyst was a propionaldehyde-iodine mixture instead of acetone-iodine. The solid nitrosyl sulfuric acid (12.7 grams) was suspended in the reaction mixture. Hydrogen chloride fed into the mixture caused the "in situ" formation of nitrosyl chloride and sulfuric acid.

Of the nitrosyl sulfuric acid thus supplied 49.7% was found to have reacted with cyclohexane after one hour in the presence of the propionaldehyde-iodine catalyst to produce cyclohexanone oxime; whereas under otherwise the same conditions but in the absence of a catalyst in accordance with our invention, only 37.3% of the nitrosyl sulfuric acid supplied was converted to cyclohexanone oxime in the same period.

EXAMPLE 4

A series of runs reacting nitrosyl chloride and cyclohexane was conducted by the procedure described in Example 1 above, except that the light source was a 500 watt tungsten filament projection lamp and the catalyst was varied as indicated in Table III below. In each instance 2300 cc. of a 2:1 by volume mixture of cyclohexane and benzene was reacted in the presence of 2 grams of the catalyst specified. Iodine, when employed, amounted to 0.2 gram.

TABLE III

| Catalyst | NOCl g./hr. | HCl g./hr. | Cyclohexanone Oxime | |
|---|---|---|---|---|
| | | | Production Rate, g./hr. | Percent Conversion (theory based on NOCl supplied) |
| None | 44 | 46 | 28 | 32 |
| Acetone | 47 | 46 | 33 | 41 |
| Iodine | 43 | 46 | 31 | 41 |
| Acetone-iodine | 44 | 46 | 36 | 47 |
| Chloroacetone | 44 | 46 | 35 | 46 |
| Iodoacetone | 44 | 46 | 37 | 48 |
| Iodoacetone-iodine | 44 | 46 | 40 | 52 |
| None | 27 | 28 | 27 | 57 |
| Trioxane | 26 | 28 | 33 | 73 |
| Trioxane-iodine | 26 | 28 | 33 | 73 |
| Acetaldehyde | 26 | 28 | 31 | 69 |
| Acetaldehyde-iodine | 27 | 28 | 37 | 79 |
| Propionaldehyde-iodine | 26 | 28 | 34 | 75 |
| n-Butyraldehyde-iodine | 26 | 28 | 29 | 65 |
| n-Valeraldehyde-iodine | 26 | 28 | 29 | 65 |
| n-Heptaldehyde-iodine | 26 | 28 | 30 | 68 |
| Benzaldehyde-iodine | 26 | 28 | 36 | 80 |
| α-Naphthaldehyde-iodine | 26 | 28 | 33 | 73 |
| Acetone-iodine | 26 | 28 | 30 | 67 |
| Methyl ethyl ketone-iodine | 26 | 28 | 30 | 66 |
| Methyl n-amyl ketone-iodine | 26 | 28 | 32 | 71 |
| Ethyl butyl ketone-iodine | 26 | 28 | 35 | 79 |
| Diisopropyl ketone-iodine | 26 | 28 | 33 | 74 |
| Acetophenone-iodine | 26 | 28 | 32 | 70 |
| Benzophenone-iodine | 26 | 28 | 31 | 68 |
| Methyl nitrite-iodine | 28 | 28 | 39 | 81 |
| Ethyl nitrite-iodine | 27 | 28 | 33 | 72 |
| n-Propyl nitrite-iodine | 28 | 28 | 37 | 76 |
| n-Hexyl nitrite-iodine | 26 | 28 | 30 | 66 |
| Methanol-iodine | 26 | 28 | 33 | 74 |
| Ethanol-iodine | 26 | 28 | 37 | 79 |
| 1-Pentanol-iodine | 26 | 28 | 38 | 85 |
| 1-Octanol-iodine | 26 | 28 | 40 | 88 |
| 1-Dodecanol-iodine | 26 | 28 | 38 | 85 |
| None | 34 | 44 | 28 | 47 |
| Cyclohexanone hydroperoxide | 34 | 44 | 32 | 54 |
| Peracetic Acid | 34 | 44 | 37 | 62 |
| 1,3-dichloro-2-propanone | 34 | 44 | 37 | 62 |
| Ethyl acetate | 34 | 44 | 39 | 66 |
| Cumene hydroperoxide | 34 | 44 | 32 | 55 |
| t-Butyl perbenzoate | 34 | 44 | 35 | 60 |
| Iso-amyl propionate | 34 | 44 | 36 | 62 |
| Crotonaldehyde | 34 | 44 | 41 | 70 |
| Phenylacetaldehyde | 34 | 44 | 36 | 61 |
| Chloral | 34 | 44 | 42 | 71 |
| Ethyl iodide [1] | 60 | 70 | 57 | 56 |
| Iodocyclohexane [1] | 60 | 70 | 65 | 63 |

[1] 450 watt U.V. lamp used as in Example 1.

These data show the catalytic effectiveness of compounds containing any one of the radicals carbonyl, hydroxyl, or nitrite, including carbonyl in peroxy acids and derivatives thereof, and hydroxyl in hydroperoxides. It will be noted that certain of the compounds used contain chloro or iodo radicals in addition to carbonyl radicals and that these compounds are in some instances more active than their non-halogenated analogs. Iodocyclohexane and ethyl iodide are representative of alkyl iodides; the results of Table III show that these two compounds are effective catalysts.

Cyclohexanone and cyclohexanol were not effective when tested by the same procedure used for testing the compounds of Table III above.

EXAMPLE 5

A series of tests was conducted by the procedure of Example 4 above except using 1300 ml. of cyclohexane and 1000 ml. of benzene.

The results of this series of tests are given in Table IV below.

TABLE IV

| Catalyst | Amount | NOCl g./hr. | HCl g./hr. | Cyclohexanone Oxime | |
|---|---|---|---|---|---|
| | | | | Production Rate, g./hr. | Percent Conversion (theory based on NOCl supplied) |
| None | | 34 | 44 | 28 | 47 |
| Cyclohexanol | 5 ml. | 34 | 44 | 27 | 47 |
| t-Butanol | 5 ml. | 34 | 44 | 35 | 60 |
| p-Benzoquinone-iodine | {2 g. / 0.2 g.} | 34 | 44 | 35 | 59 |
| Phenol | 2 g. | 34 | 44 | 36 | 62 |
| Phenol-iodine | {2 g. / 0.2 g.} | 34 | 44 | 33 | 57 |
| Lauroyl peroxide | 2 g. | 34 | 44 | 33 | 55 |

EXAMPLE 6

The effects of various solvents are shown by the results of experiments, the data for which are recorded in Table V below. These data were obtained following the procedure described in Example 1 above with the exception that the actinic light source was a 500 watt tungsten filament projection lamp in place of the ultraviolet lamp.

TABLE V

| Catalyst | Cyclohexane, ml. | Solvent, ml. | NOCl, g./hr. | HCl g./hr. | Cyclohexanone Oxime | |
|---|---|---|---|---|---|---|
| | | | | | Production Rate, g./hr. | Percent Conversion (theory based on NOCl supplied) |
| Acetone-iodine | 1,300 | none | 26 | 28 | 32 | 70 |
| Do. | 870 | 430 benzene | 26 | 28 | 30 | 67 |
| Do. | 870 | 430 chlor-benzene | 26 | 28 | 31 | 68 |

These data indicate that under the conditions of these tests the non-reactive solvent has little or no effect upon the rates and yields of cyclohexanone oxime production. The adherence of resinous byproduct to the walls of the reaction vessel is more noticeable when ultraviolet light is used (see Run E in Table I above); it does not become a problem when a tungsten filament lamp is used except over relatively long periods of reaction.

EXAMPLE 7

(A) A mixture of 1000 cc. of n-hexane and 1300 cc. of benzene, 2 cc. of acetone, and 0.2 g. iodine was reacted by essentially the procedure of Example 1 with nitrosyl chloride in presence of hydrogen chloride, using a 500 watt tungsten filament projection lamp as the light source. The nitrosyl chloride was supplied to the cold (10° C. to 15° C.) reaction mixture at the rate of 34 grams per hour and the hydrogen chloride was supplied thereto at the rate of 44 grams per hour. Thereby 13 grams of hexanone oxime per hour was obtained, equivalent to a conversion of hexane to oxime of 23% of theory based on the nitrosyl chloride supplied.

(B) In the absence of a catalyst of our invention, but using otherwise the procedure of part (A) of this example, only 11 grams of oxime per hour was obtained, equivalent to conversion of hexane to oxime of 19% of theory based on the nitrosyl chloride supplied.

(C) Using the procedure of part (A) of this example except that a 450 watt ultraviolet light bulb as in Example 1 was used as the source of actinic light, n-hexane was converted at the rate of 24.5 grams/hr. into hexanone oxime, equivalent to conversion of 41% of theory based on nitrosyl chloride supplied.

EXAMPLE 8

A mixture consisting of 1000 grams of cyclohexane and 615 grams of benzene was saturated with hydrogen chloride, and 221 grams of sulfuric acid C.P. grade and 2 cc. of iodocyclohexane were added. The mixture was cooled to 10° to 15° and illuminated with ultraviolet radiation from a 450 watt mercury vapor lamp immersed in the mixture. Nitrosyl chloride was passed into the mixture at the rate of 60 grams per hour for one hour.

At the conclusion of the run the volume of the sulfuric acid layer had increased by one-third. The acid layer was separated, neutralized with aqueous sodium hydroxide and extracted with ether. Thereby 61 grams of cyclohexanone oxime were obtained (58.8% conversion based on NOCl supplied).

It can thus be seen that an improved process for the preparation of ketoximes has been devised, which is readily adaptable to continuous operation. The process used in conjunction with a rearrangement step is suitable for the continuous production of lactams, such as caprolactam, which is a basic raw material for the production of superpolyamides in a manner well known in this art.

This invention has been described and illustrated with reference to specific embodiments thereof. While these examples include our preferred procedures, it is obvious that many variations can be made in these illustrated procedures and that such are included within the scope of our invention which is limited only by the claims appended hereto and the equivalents thereof.

Whereas in laboratory operation it is customary to allow reaction times such that all or most of the nitrosating agent is consumed, in large scale continuous operation, the reaction time is advantageously limited so that the nitrosating agent will generally react to less than completion, the unreacted nitrosating agent being advantageously recovered and recycled.

In this specification we have, for the purposes of clarification, resorted to certain theoretical explanations, but our invention is not to be understood as limited by these theories.

We claim:

1. In a process for production of a saturated aliphatic oxime wherein a nitrosating agent and a saturated aliphatic compound react in the presence of acitinic light, the improvement which comprises providing throughout the reaction mixture, as catalyst, at least one compound of the group consisting of quinones; phenols; aryl iodides; aldehydes; open chain alcohols; nitrous esters of said alcohols; esters of carboxylic acids; open chain ketones; peroxycarboxylic acids; peroxycarboxylic esters; carboxylic acid peroxides; organic hydroperoxides; and aliphatic iodides.

2. An improvement as defined in claim 1 wherein the saturated aliphatic compound is a normally liquid saturated aliphatic hydrocarbon and wherein free hydrogen halide is maintained present in the reaction mixture.

3. An improvement as defined in claim 2 wherein a strong, concentrated acid, with boiling point when anhydrous of at least 40° C. and immiscible with saturated hydrocarbons, is provided in the reaction zone, said acid being at least as strong as ortho-phosphoric acid.

4. An improvement as defined in claim 2 wherein the nitrosating agent is nitrosyl chloride, the hydrogen halide is hydrogen chloride, the hydrocarbon is cyclohexane, and an inert solvent for reaction byproducts is present in the reaction mixture.

5. An improvement as defined in claim 4 wherein the catalyst is a $C_1$–$C_4$ primary alkanol.

6. An improvement as defined in claim 5 wherein the catalyst is methanol.

7. An improvement as defined in claim 1 wherein a halogen of the group consisting of chlorine, bromine and iodine is present in the reaction mixture together with said catalyst.

8. An improvement as defined in claim 7 wherein the catalyst is an aldehyde.

9. An improvement as defined in claim 7 wherein the catalyst is an open chain ketone.

10. An improvement as defined in claim 7 wherein the catalyst is a $C_1$–$C_4$ primary alkanol.

11. An improvement as defined in claim 7 wherein the catalyst is ethanol and the halogen is iodine.

12. An improvement as defined in claim 1 wherein the saturated alipahtic compound is cyclohexane; the nitrosating agent is nitrosyl chloride; the catalyst amounts to about 0.1–10% by weight based on the weight of cyclohexane employed; free hydrogen chloride is maintained present in the reaction mixture; the actinic light employed has the major proportion of its intensity at wavelengths between 200 and 600 millimicrons; and the reaction temperatures are in the range between about 10° C. and about 25° C.

13. An improvement as defined in claim 12 wherein the reaction is conducted continuously with reaction times limited so that the nitrosating agent will react to less than completion and the unreacted nitrosating agent is recycled.

14. An improvement as defined in claim 12 wherein the catalyst is an aldehyde, and wherein iodine is present in the reaction mixture.

15. An improvement as defined in claim 12 wherein the catalyst is an open chain ketone and wherein iodine is present in the reaction mixture.

16. An improvement as defined in claim 12 wherein the catalyst is a $C_1$–$C_4$ primary alkanol, and wherein iodine is present in the reaction mixture.

17. An improvement as defined in claim 16, wherein the catalyst is ethanol.

18. An improvement as defined in claim 16 wherein the catalyst is methanol.

19. An improvement as defined in claim 12 wherein presence of free hydrogen chloride in the reaction mixture is maintained by providing in the reaction zone a strong, concentrated acid with boiling point when anhydrous of at least 40° C. and immiscible with the reaction mixture, said acid being at least as strong as ortho-phosphoric acid; and an inert solvent for reaction byproducts is present in the reaction mixture.

20. An improvement as defined in claim 19 wherein the strong acid is about 70% to 100% sulfuric acid.

21. An improvement as defined in claim 19 wherein the catalyst is an aldehyde and wherein iodine is present in the reaction mixture.

22. An improvement as defined in claim 19 wherein the catalyst is an open chain ketone and wherein iodine is present in the reaction mixture.

23. An improvement as defined in claim 19 wherein the catalyst is an alkyl iodide.

References Cited in the file of this patent
UNITED STATES PATENTS

| | | |
|---|---|---|
| 2,719,116 | Brown | Sept. 27, 1955 |
| 2,818,380 | Welz | Dec. 31, 1957 |
| 2,879,215 | Reppe et al. | Mar. 24, 1959 |